United States Patent
Patterson

(10) Patent No.: US 9,719,600 B2
(45) Date of Patent: Aug. 1, 2017

(54) HARD SWAP SHUTTLE VALVE

(71) Applicant: Proserv Operations, Inc., Houston, TX (US)

(72) Inventor: Andy Patterson, Katy, TX (US)

(73) Assignee: Proserv Operations, Inc., Houston, TX (US)

( * ) Notice: Subject to any disclaimer, the term of this patent is extended or adjusted under 35 U.S.C. 154(b) by 96 days.

(21) Appl. No.: 14/718,973

(22) Filed: May 21, 2015

(65) Prior Publication Data

US 2015/0362083 A1    Dec. 17, 2015

Related U.S. Application Data

(60) Provisional application No. 62/011,614, filed on Jun. 13, 2014.

(51) Int. Cl.
  *F16K 11/044* (2006.01)
  *F16K 11/07* (2006.01)

(52) U.S. Cl.
  CPC ........ *F16K 11/044* (2013.01); *F16K 11/0712* (2013.01); *Y10T 137/0379* (2015.04); *Y10T 137/2567* (2015.04); *Y10T 137/86501* (2015.04)

(58) Field of Classification Search
  CPC ......... Y10T 137/2567; Y10T 137/2569; Y10T 137/7852; Y10T 137/0379; Y10T 137/86501; G06K 9/00375; G06K 9/00536; G06K 9/00805; G06K 9/00845; G06K 9/4604; G06K 9/4652; F16K 11/044; F16K 11/0712; B60W 50/14

USPC ...... 137/112, 113, 514.5; 251/900, 318–334, 251/363

See application file for complete search history.

(56) References Cited

U.S. PATENT DOCUMENTS

| | | | | |
|---|---|---|---|---|
| 2,685,296 A | * | 8/1954 | Boosman | F16K 11/044 137/112 |
| 2,729,226 A | * | 1/1956 | Jones | B60T 11/28 137/112 |
| 2,811,979 A | * | 11/1957 | Presnell | F15B 13/02 137/112 |
| 2,821,972 A | * | 2/1958 | Banker | F02M 37/0023 123/434 |
| 2,892,644 A | * | 6/1959 | Collins | F16J 15/32 251/324 |
| 3,145,723 A | * | 8/1964 | Chorkey | F16K 17/164 137/112 |

(Continued)

*Primary Examiner* — William McCalister
(74) *Attorney, Agent, or Firm* — Patterson & Sheridan, L.L.P.

(57) ABSTRACT

In one aspect, a valve is provided. The valve includes a body having a first inlet, a second inlet and an outlet. The valve further includes a shuttle disposed in the body. The shuttle is movable within the body between a first position and a second position, wherein the first inlet is open and the second inlet is closed when the shuttle is in the first position, and wherein the first inlet is closed and the second inlet is open when the shuttle is in the second position. In addition, the valve includes a non-metallic seal assembly disposed adjacent each inlet. The seal assembly having a seal member with a V-shaped configuration. In another aspect, a method of moving a shuttle in a valve is provided. The method includes three stages of dampening which slows the velocity of the shuttle as it moves within a body of the valve toward an inlet.

7 Claims, 6 Drawing Sheets

(56) References Cited

U.S. PATENT DOCUMENTS

| | | | | |
|---|---|---|---|---|
| 3,533,431 A * | 10/1970 | Kuenzel | ............... | F15B 13/00 |
| | | | | 137/113 |
| 3,540,695 A * | 11/1970 | Taylor | ............... | F16K 31/528 |
| | | | | 251/259 |
| 4,253,481 A * | 3/1981 | Sarlls, Jr. | ............ | F16K 11/044 |
| | | | | 137/112 |
| 4,281,677 A * | 8/1981 | Hoffman | ............... | B60T 17/18 |
| | | | | 137/113 |
| 5,190,078 A * | 3/1993 | Stoll | ............... | F16K 11/0712 |
| | | | | 137/625.69 |
| 6,296,008 B1 * | 10/2001 | Boyer | ............... | F17C 13/045 |
| | | | | 137/113 |
| 6,318,400 B1 * | 11/2001 | Hope | ............... | G05D 16/103 |
| | | | | 137/111 |
| 8,397,742 B2 * | 3/2013 | Thrash | ............... | F16K 11/044 |
| | | | | 137/111 |
| 2005/0028864 A1 * | 2/2005 | Thrash, Jr. | ............ | F16K 3/265 |
| | | | | 137/112 |

* cited by examiner

US 9,719,600 B2

HARD SWAP SHUTTLE VALVE

FIELD

Embodiments of the invention relate to the field of valves, and more particularly to shuttle valves.

BACKGROUND

Shuttle valves may be employed in connection with underwater oil field equipment. For example, the lower ends of two hydraulic fluid accumulators (e.g., tanks with air space in the top thereof) may be connected to the inlets of a shuttle valve. Each of two high pressure flow lines feeding the accumulators may be connected thereto between the shuttle valve and one of the tanks, via ancillary control valves. The outlet of the shuttle valve will supply fluid to the valve outlet from whichever one of inlets is connected to the flow line having the higher pressure.

It is especially important that underwater shuttle valves have a long trouble-free life because of their inaccessibility. Due to the high working pressures, the possible differential pressure on such shuttle valves is very high. As a result, when the pressure differential on the opposite sides of the shuttle of the valve is high, the valve may move at a high velocity. Sometimes the resulting high velocity of a shuttle as it moves from one seat to another creates a sufficient energy impact with the valve cage to cause the shuttle to be damaged, or the resilient seal of the valve to be extruded, thus disrupting proper valve operation. There is a need therefore for a shuttle valve having a shuttle assembly that will operate reliably for extended periods of time.

SUMMARY

In one aspect, a valve is provided. The valve includes a body having a first inlet, a second inlet and an outlet. The valve further includes a shuttle disposed in the body. The shuttle is movable within the body between a first position and a second position to selectively seal off one of the first and second inlets, wherein the first inlet is open and the second inlet is closed when the shuttle is in the first position, and wherein the first inlet is closed and the second inlet is open when the shuttle is in the second position. In addition, the valve includes a seal assembly disposed adjacent each inlet. The seal assembly has a circumferential seal member with a V-shaped, in cross section, configuration, which is received within a circumferential dovetail shaped groove, such that the outer flanks of the sides of the V seal against the walls of the dovetail shaped groove.

In a further aspect, the V-shaped seal member includes a concave portion in the crotch of the V shape of the circumferential seal member, within which is received a biasing member which is configured to bias the seal in a direction radially inwardly. The bias ensures that the outer flanks or sides of the V-shaped seal engage against the sides of the dovetail groove, and reduces the likelihood that the seal will become extruded or pulled out of the dovetailed groove in the direction of the shuttle.

In another aspect, a method of moving a shuttle in a valve is provided. The valve includes a seal assembly and a body with a first inlet, a second inlet and an outlet. The method includes the step of opening the first inlet of the body by applying a pressure to the shuttle at the first inlet which causes the shuttle to move along a path within the body of the valve toward the second inlet. The method further includes the step of slowing the movement of the shuttle within the body of the valve when the shuttle reaches a first stage dampening position, when the shuttle reaches a second stage dampening position, and when the shuttle reaches a third stage dampening position along the path within the body. Additionally, the method includes the step of closing the second inlet of the body.

DETAILED DESCRIPTION

Cushioned shuttle valves operate with high flow rates and typically with hydraulic fluid present in the valve. In operation, the shuttle of the valve is positionable between opposed fluid inlets to the body of the valve, and the body of the valve is also communicable with a fluid outlet. The shuttle is reciprocally moveable between positions sealing one of the inlets and opening one of the inlets, and is also, momentarily, positioned in an intermediate location between the inlets where neither inlet is sealed as the shuttle moves from a sealing position of one of the inlets to a sealing position of the other of the inlets. The shuttle is moveable within a pair of opposed cages, which are disposed adjacent each inlet and aligned with one another to allow the shuttle to move therebetween based upon the difference in pressure on the opposite sides of the shuttle.

When the shuttle collar moves inwardly of the cage dashpot cylinder, fluid contained between the forward leading edge of the collar and the bottom edge of the cage dashpot cylinder is expelled through the restrictive annular gap formed by the outer cylindrical portion of the shuttle and the inner diameter of the cage. The restrictive annular gap acts like an orifice to limit fluid flow therepast to form a higher pressure region ahead of the shuttle in the direction of travel to slow the speed of the shuttle, creating a cushioning affect. In the end of shuttle stroke position, the pressure seal to seal the inlet being sealed, as among the opposed inlets, is provided by a seal sealing against the outer circumferential surface of the shuttle.

There is a need in the industry for a type of cushioned shuttle valve in subsea installations, which may occasionally be exposed to a "hard swap" function. The hard swap function involves shifting the shuttle, at maximum operating flow and pressure, and subsequently closing a control valve on the outlet line. This operating scenario results in a pressure spike within the shuttle valve. The pressure spike produced must be reliably contained by the shuttle. To achieve reliable operation at maximum operating flows and pressures, the two extrusion resistant resilient seals and shuttle is described. Mechanical dampening is applied twice during each half cycle, utilizing sleeve counter bores and resilient seals, maximizing the ability of the shuttle valve to reduce the speed of the shuttle during each half cycle. A split dovetail groove geometry is provided to closely match the geometry of the resilient (V-shaped in section) seal, reducing the likelihood that the seal will extrude out of the groove during operation of the valve. The use of resilient seal caps and spacers reduces the possibility of galling and seizure of the shuttle. To better understand embodiments of the valve, the valve will be described in relation to the following drawings.

Figure 1:
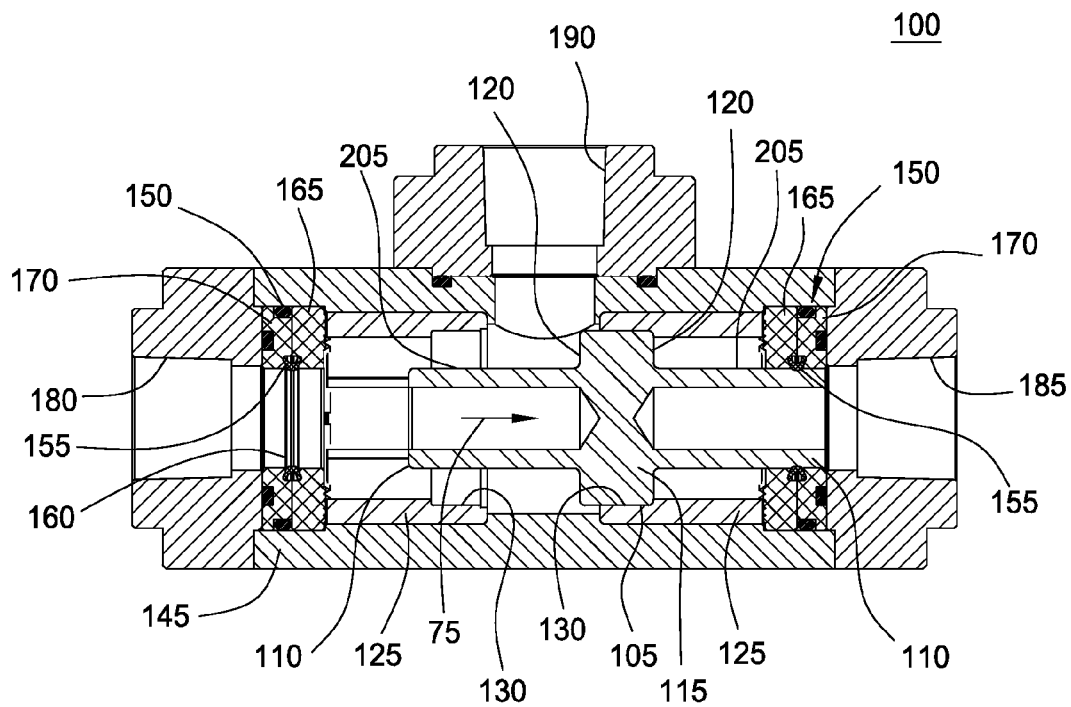
FIG. 1 illustrates a cross-sectional view of a valve with a shuttle in a first position.

FIG. 1 illustrates a cross-sectional view of a valve 100 with a shuttle 105 in a first position. The shuttle 105 is movable within a body 145 of the valve 100 between the first position, a middle position, and a second position. FIG. 1 shows the shuttle in the first position, wherein a first inlet 180 to the valve is open and a second inlet 185 to the valve is closed. The valve 100 includes a cage 125 and a seal assembly 150 adjacent each of the inlets 180, 185. As will be described herein, the components of the valve 100 are configured to provide a desired cushioning or dashpot action on the shuttle 105 as the shuttle 105 moves through the body 145 of the valve 100. More specifically, the movement of the shuttle 105 is dampened (or slowed) when the shuttle 105 moves along a path in the body 145 to a first stage dampening position, a second stage dampening position and a third stage dampening position. Generally, the first stage dampening position occurs prior to the shuttle 105 disengaging from the seal assembly 150 adjacent the net 185 it is sealing in FIG. 1 as it moves along the path toward the opposed net 180 which is in an open condition in FIG. 1. The second stage dampening position occurs as the shuttle 105 begins to move inwardly of the opposed cage 125 as it moves toward the net 180. The third stage dampening position occurs as the leading edge of the shuttle 105 engages the seal assembly 150 adjacent the inlet 180 as it continues moving toward the net 180. The three stage dampening of the shuttle 105 occurs as the shuttle 150 moves from the net 185 toward the net 180, as shown in FIGS. 1-8. A similar three stage dampening of the shuttle 105 occurs as the shuttle moves from the net 180 toward the net 185, i.e., in the reverse direction.

To reduce metal to metal friction, galling and corrosion the contacting, and thus wearing of the valve components, of the valve 100 may be made from a material such as Nitronic 60, PTFE, white Delrin or other subsea compatible material.

The shuttle 105 is configured as a generally right cylindrical member, having a generally cylindrical end portion 110 at each, opposed, side thereof. The end portions 110 are separated by a cylindrical collar 115. The collar 115 includes annular sides 120 configured as annuli extending from the outer circumference of the collar 115 to the outer circumference of the end portions 110 extending from the collar 115, and are configured to be received within a counter bore 130 of one of the respective cages 125, and eventually about the base of the counterbore to restrict further movement of the shuttle 105 inwardly of the counterbore 105. The shuttle 105 is adapted to slide axially within the body 145 of the valve 100 in the direction toward one or the other seal assembly 150 according to whether the pressure on one end portion 110 is lower than that on the opposed end portion 110. For example, if the pressure at inlet 180 on the left hand end is higher and thus the pressure at inlet 185 on the right hand end is lower, the shuttle 105 moves in the direction of arrow 75 in FIG. 1 to engage the seal assembly 150 on the right hand side of the Figure as is shown in FIG. 1. In one embodiment, the ends of the shuttle 105 are hollow, i.e., a cylindrical bore extends inwardly thereof to leave an outer end portion 110 wall, which lightens mass of the shuttle 105 and thus reduces the momentum and closing impact force of the shuttle 105.

The outer diameter of the shuttle 105 is sized such that there is a small tolerance gap between the circumferential surfaces of the shuttle 105 and the circumferential surfaces of the other components of the valve 100.

Figure 2:
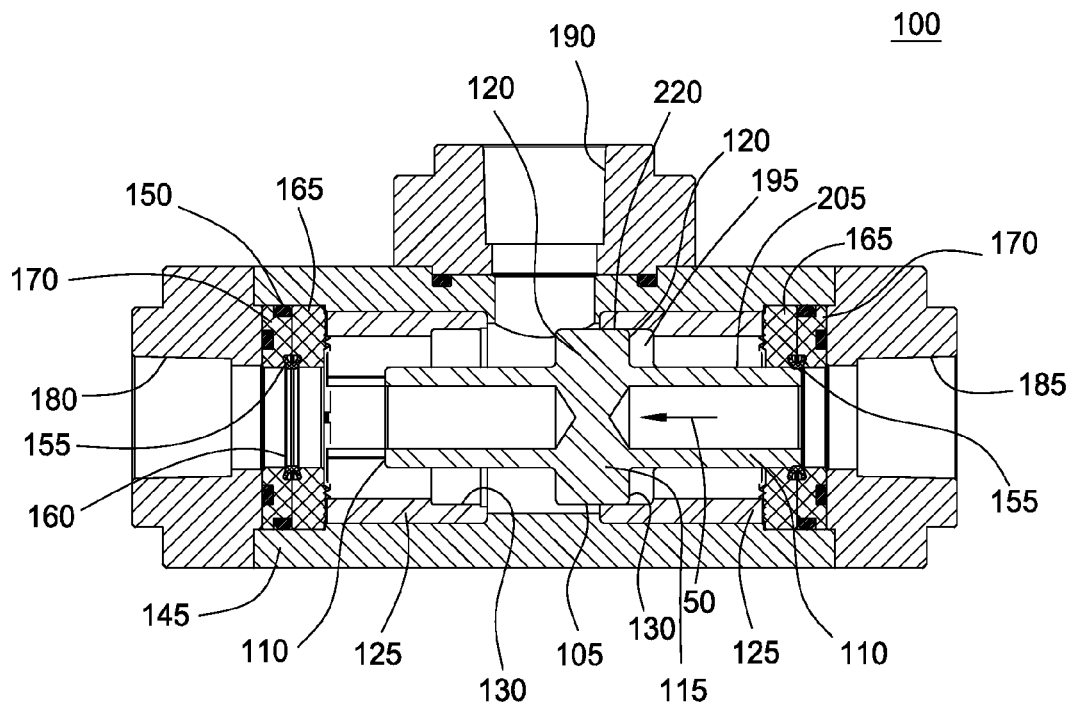
FIG. 2 illustrates a cross-sectional view of the valve with the shuttle in an intermediate position, as a collar of the shuttle disengages a counter bore of a cage and a first stage dampening is initiated.

FIG. 2 illustrates a cross-sectional view of the valve 100 with the shuttle 105 in an intermediate position and moving in the direction of arrow 50 (to the left direction of FIG. 2) and where dampening is initiated a first time. With the shuttle 105 positioned as shown, the inlet 185 is starting to open. When pressure is applied to the inlet 185 which is greater than the pressure at inlet 180, the shuttle 105 begins to move away from the inlet 185 and toward the inlet 180. At this position, the pressure at the inlet 185 acts on an area defined by a guided outer diameter 205 of the shuttle 105. As the shuttle 105 in the position shown in FIG. 2 moves toward the inlet 180 as shown by arrow 50, fluid from the inlet 185 is initially drawn through the small annular space between the end portion 110 adjacent inlet 185 and seal spacer 165 extending thereabout into an expanding space 195 defined by the side 120 of the collar 115 and a seal 155 in the seal assembly 150 by the inlet 185. The volume of the space 195 increases as the shuttle 105 moves toward inlet 180 in the direction of arrow 50. When the shuttle 105 is in this first stage dampening position as shown in FIG. 2, an annular gap 220 between the outer diameter of the collar 115 and the inner diameter of the counter bore 130 in the cage 125 disposed adjacent the inlet 185 effectively acts as a single orifice (e.g., mechanical dampener) across which fluid must also travel to fill the increasing volume of the space 195. Without the mechanical dampening, the shuttle 105 would move at a speed that is substantially equal to an unrestricted velocity of the fluid entering the inlet 185. In other words, the dampening reduces the speed of the shuttle 105 as it advances toward the inlet 180. Further, the combination of friction between the guided outer diameter 205 of the shuttle 105 and the seal 155, and pressure applied at the inlet 185, do not extrude the seal 155, which is retained fully within a seal groove 160. In this manner, the timing of release between the shuttle 105 and the cushioning bore (i.e., counter bore 130) and the engagement of the shuttle 105 and the seal 155 is optimized to maximize the cushioning affect and improve the seal retention.

Figure 3:
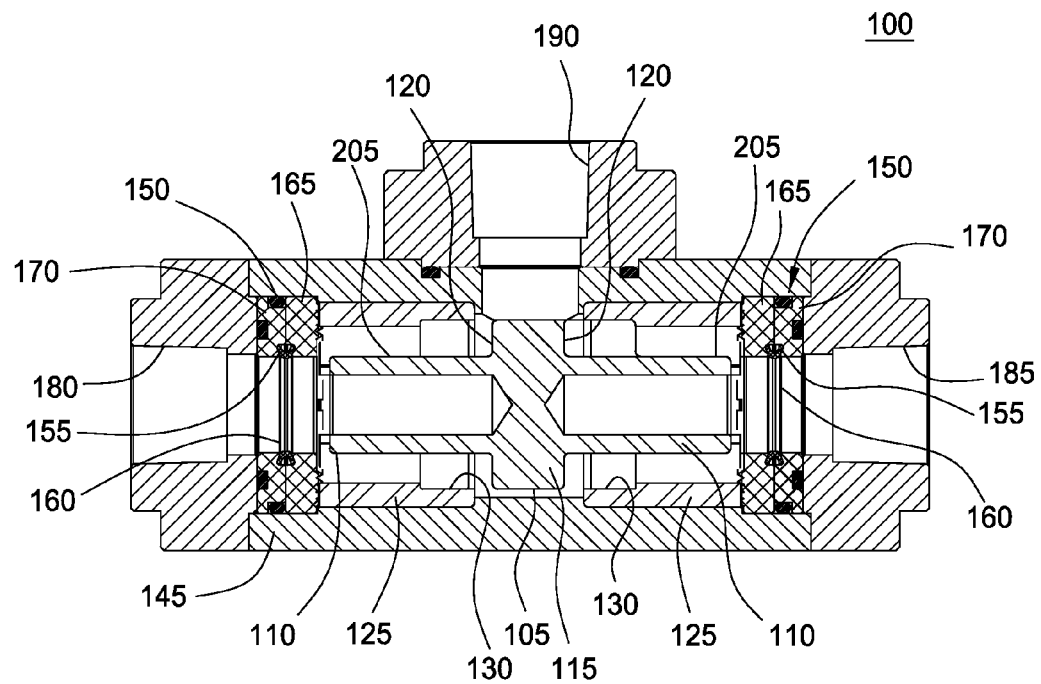
FIG. 3 illustrates a cross-sectional view of the valve with the shuttle in a middle position between the opposed openings thereinto.

FIG. 3 illustrates a cross-sectional view of the valve 100 with the shuttle 105 in the middle position. At this position, the shuttle 105 moves at a speed substantially less than the velocity of the fluid entering into the inlet 185 since flow is bypassing the shuttle 105 to the outlet 190 and the inlet 180. The shuttle 105 is symmetric about the center of the collar 115. The cages 125 are symmetric about the center of the outlet 190. When the shuttle 105 is in the middle position, flow paths exist between both ends 110 of the shuttle 105 and both resilient seal spacers 165 of the seal assemblies 150 such that both inlets 180, 185 are in communication with the outlet 190. The time during which all three ports 180, 185, 190 are in communication is a fraction of a second. This affect is described as "open center" within the control valve industry.

Figure 4:
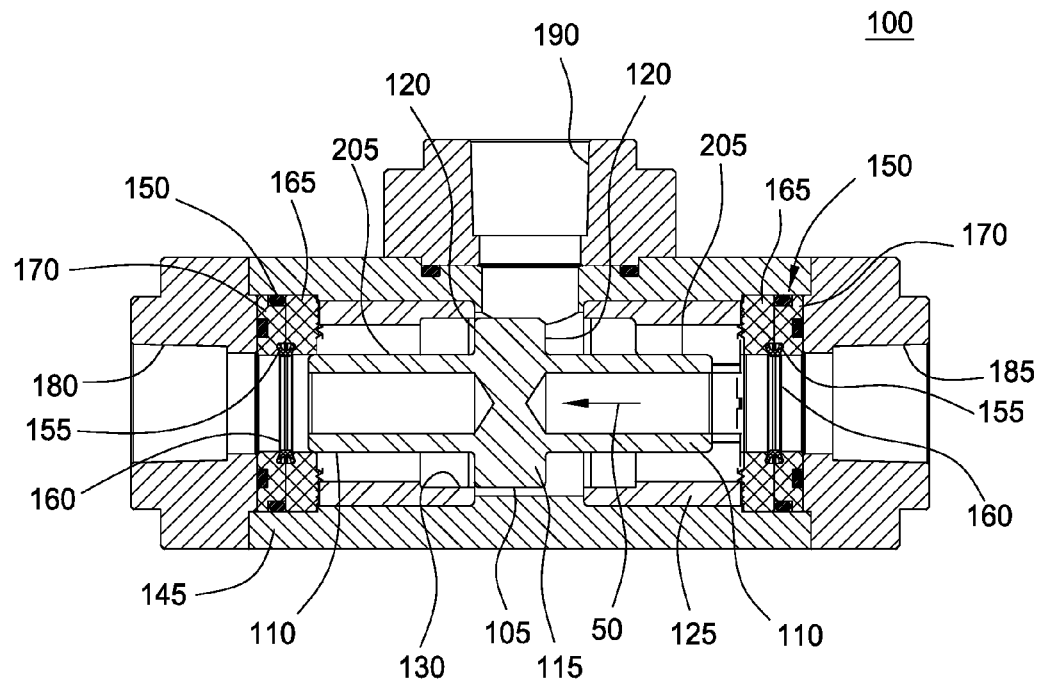
FIG. 4 illustrates a cross-sectional view of the valve with the shuttle in an intermediate position.

FIG. 4 illustrates a cross-sectional view of the valve 100 as it continues to move toward the inlet 180 due to the pressure applied to the inlet 185. The leading end of the guided outer diameter 205 of the shuttle 105 is engaging the seal spacer 165 of the seal assembly 150 thereby directing all pressure applied at the inlet 185 to flow out the outlet 190.

Figure 5:
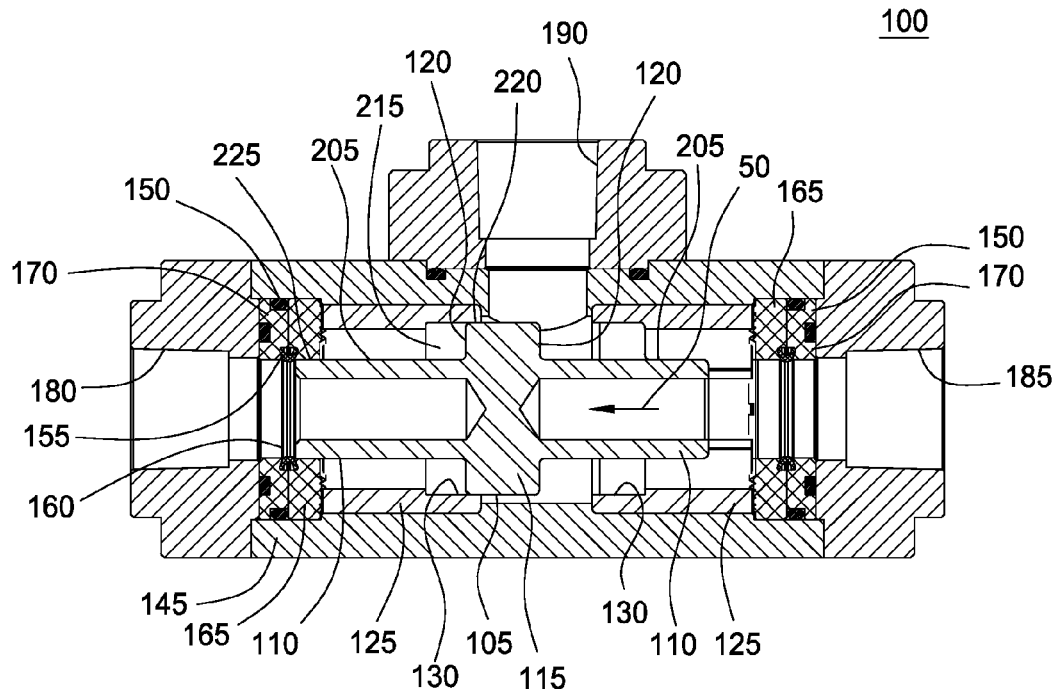
FIG. 5 illustrates a cross-sectional view of the valve as the collar of the shuttle engages a counter bore of a cage and a second stage dampening is initiated.

FIG. 5 illustrates a cross-sectional view of the valve 100 as the collar 115 of the shuttle 105 moves inwardly of the counter bore 130 of the cage 125 adjacent to inlet 180 and dampening is initiated a second time. As the shuttle 105 moves in the direction shown by arrow 50 toward the inlet 180, fluid is expelled from a space 215 that is defined by the annular side 120 of the collar 115 and the counter bore 130 of the cage 125. As the volume of the space 215 decreases due to the movement of the shuttle 105 in the direction of arrow 50, a first annular gap 220 is formed between the outer diameter of the collar 115 of the shuttle 105 and the inner diameter of the counter bore 130 of the cage 125 and a second annular gap 225 is formed between the guided outer diameter 205 of the ends 110 of the shuttle 105 and the inner diameter of the seal spacer 165 of the seal assembly 150 adjacent the inlet 180. When the shuttle 105 is at the second stage dampening position as shown in FIG. 5, the first annular gap 220, and the second annular gap 225 effectively act as two orifices (e.g., mechanical dampening) across which fluid must travel to empty the decreasing volume of the space 215. Without the mechanical dampening, the shuttle 105 would move at a speed substantially equal to the shuttle 105 moving across the outlet 190 as shown in FIG. 4. In other words, the dampening reduces the speed of the shuttle 105 as the shuttle 105 moves within the body 145 of the valve 100.

Figure 6:
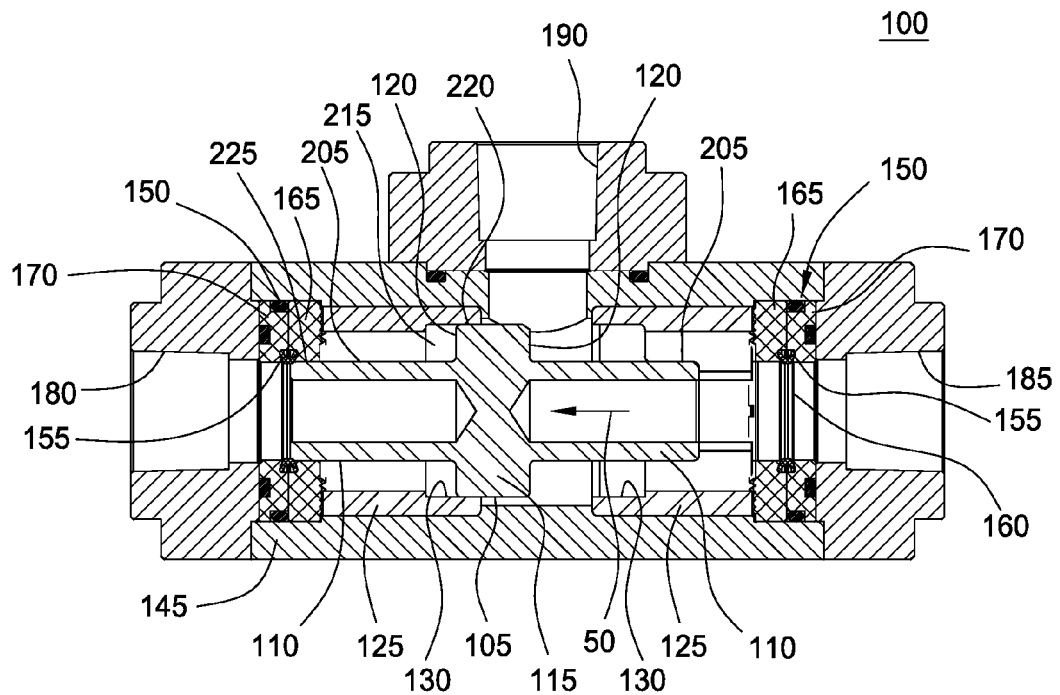
FIG. 6 illustrates a cross-sectional view of the valve with the shuttle in an intermediate position and a third stage dampening is initiated.

FIG. 6 illustrates a cross-sectional view of the valve with the shuttle in an intermediate position and dampening is initiated a third time. As shown, the inlet 180 of the valve 100 is closing. At this point, there is no flow through the inlet 180 because the leading edge of the guided outer diameter 205 of the shuttle 105 is engaged with the seal 155. More specifically, as the shuttle 105 continues to move toward the inlet 180, the guided outer diameter 205 of the ends 110 of the shuttle 105 engages the seal 155 adjacent the inlet 180. The impact of the leading edge of the shuttle 105 is absorbed by the seal 155 and the seal spacer 165. At substantially the same time, the reduced cross section of the seal 155 deforms to further fill the groove 160 within the seal cap 170 and the seal spacer 165. With the second annular gap 225 closed due to the engagement of the shuttle 105 and the seal 155, fluid is expelled from the space 215 only through the first annular gap 220 such that the fluid flow is further restricted than in the second stage dampening position. When the shuttle 105 is at the third stage dampening position as shown in FIG. 6, the first annular gap 220 acts as a single orifice (e.g., mechanical damper) as the shuttle 105 moves in direction of arrow 50. As set forth herein, without the mechanical dampening of the shuttle 105, the shuttle 105 would move at a speed substantially equal to the shuttle 105 as shown in FIG. 4. The third stage of dampening of the shuttle 105 further reduces the speed of the shuttle 105 by resisting the movement of the shuttle 105 as it advances toward the inlet 180.

Figure 7:
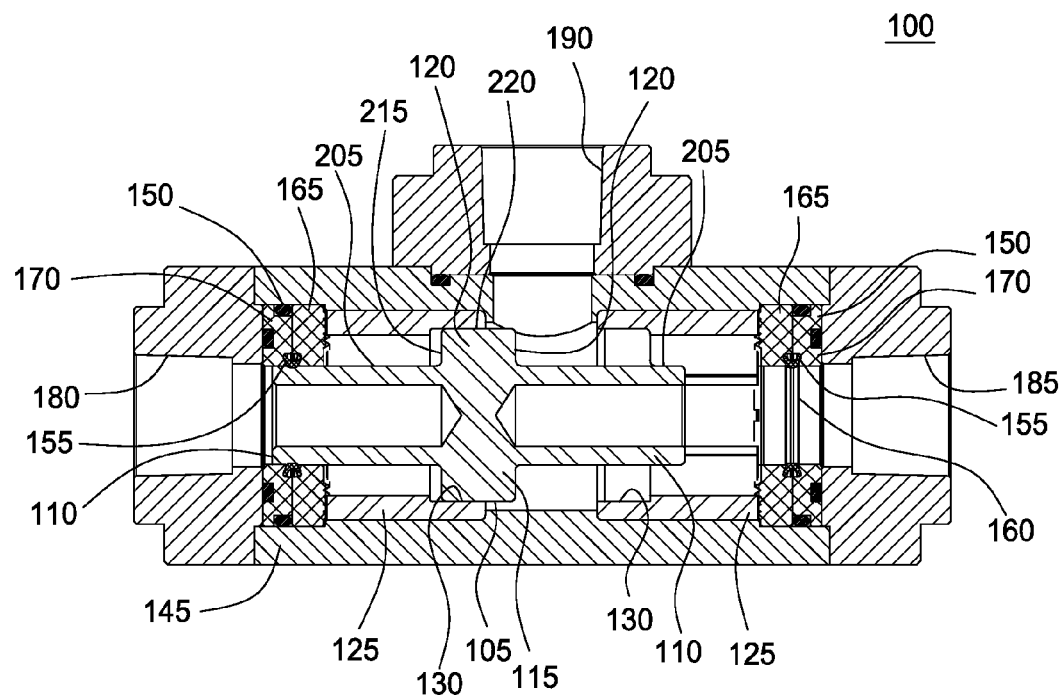
FIG. 7 illustrates a cross-sectional view of the valve.

FIG. 7 illustrates a cross-sectional view of the valve 100. The effective orifice formed by the first annular gap 220 between the outer diameter of the collar 115 of the shuttle 105 and the inner diameter of the counter bore 130 of the cage 125 continues to slow the movement of the shuttle 105 as it approaches the fully closed position.

Figure 8:
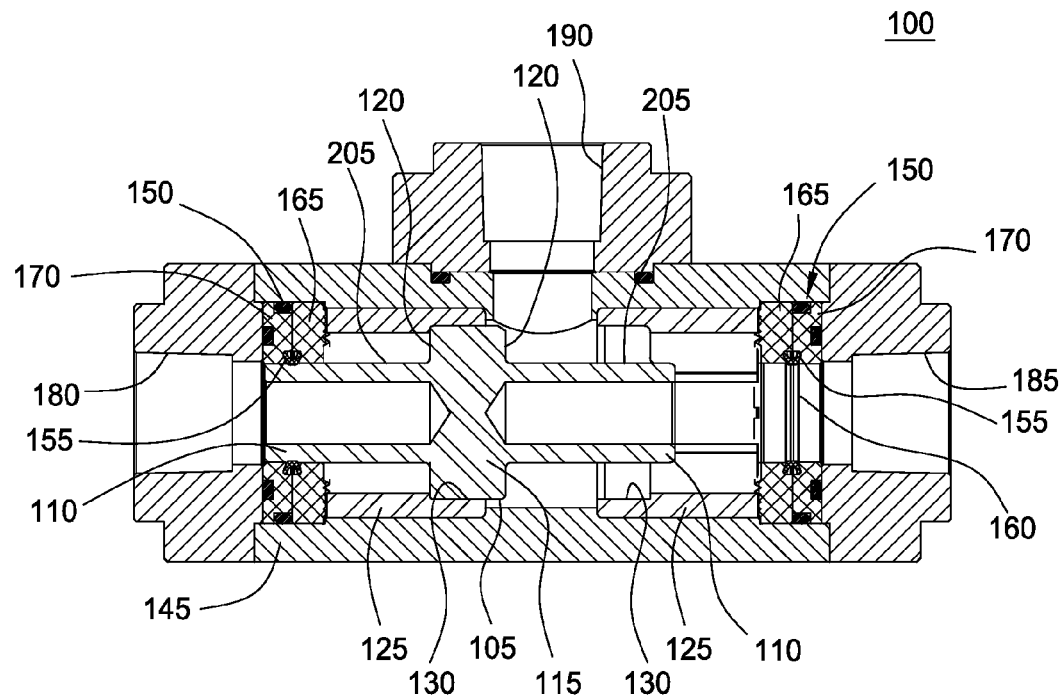
FIG. 8 illustrates a cross-sectional view of the valve in the second position.

FIG. 8 illustrates a cross-sectional view of the valve 100 in the second position. As shown, the inlet 185 is fully open and the inlet 180 fully closed when the valve 100 is in the second position. As also shown, the side of the collar 115 of the shuttle 105 is sitting flat against the bottom of the counter bore 130 in the cage 125. In one embodiment, the valve 100 is rated at 5000 PSI.

As described above, three dampening stages are provided to dampen the movement of the shuttle, i.e., reduce the shuttle speed from the speed it would have solely from the difference in pressure between the inlets 180, 185. The first dampening occurs as the end 110 of the shuttle moves away from an inlet 180 or 185 such that seal 155 no longer is engaged on the outer guided diameter 205 thereof. The second dampening occurs as the leading edge of the end 110 moves inwardly of the inner diameter of the seal spacer 165 of the seal assembly 150 and the collar 105 moves inwardly of the counterbore 130 of the cage adjacent the opposite inlet (180 or 185). The third dampening occurs when the end 110 engages the seal 155 at the opposed inlet (180 or 185)

Figure 9:
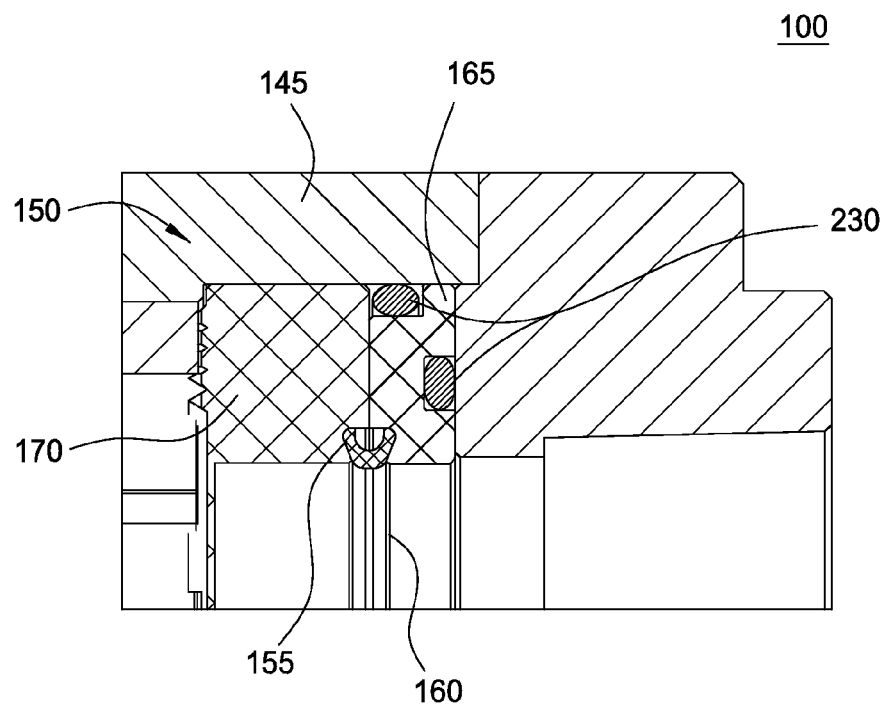
FIG. 9 illustrates an enlarged view of a seal assembly of the valve.

FIG. 9 illustrates an enlarged view of the seal assembly 150 of the valve 100. The seal assembly 150 includes the seal 155 disposed in the groove 160. In one embodiment, the seal groove 160 is a V-shaped groove. As shown, a first portion of the groove 160 is formed in the seal spacer 165 and a second portion of the groove 160 is formed in the seal cap 170. In another embodiment, the entire groove 160 is formed in seal spacer 165 or the seal cap 170. The seal assembly 150 also includes seals 230 that engage with the body 145 of the valve 100. In one embodiment, the seal spacer 165 and the seal cap 170 are made from Delrin 511P or a non-metallic material which eliminates metal to metal contact between the shuttle 105 and the spacer 165 when the shuttle 105 moves toward the first position or the second position. As shown in FIG. 9, the seal spacer 165 and the seal cap 170 are two separate pieces. In one embodiment, the seal spacer 165 and the seal cap 170 are a single integral piece.

As shown in the cross-section on FIG. 9, the seal 155 is adapted to mate with the groove 160. The seal 155 has a V-shaped configuration that engages the groove 160 which produces a flexible compressive shape while still interlocking with the groove 160. In one embodiment, the seal 155 may compress a predetermined amount per side when the guided outer diameter 205 of the shuttle 105 is engaged with the seal 155.

The seal cap 170 utilizes raised concentric V-shaped crests which conform during assembly thereby allowing the flange metal face to be fastened against the body metal face while the flanks of the V shaped (in section) seal 155 are brought into contact with the sides of the interior of the dovetail shaped groove. The resilient concentric V-shaped crests of the spacer 165 deform as required to fill the gap between the seal cap 170 and the cage 125 when the flange metal face is preloaded against the body metal face using caps crews. Installed in this manner the seal spacer 165 is locked into position and the dimensions of the groove 160 are unaffected. In one embodiment, the seal groove 160 is a split dovetail groove. In one embodiment, the seal 155 is a polytetrafluoroethylene (PTFE) seal.

Figure 10:
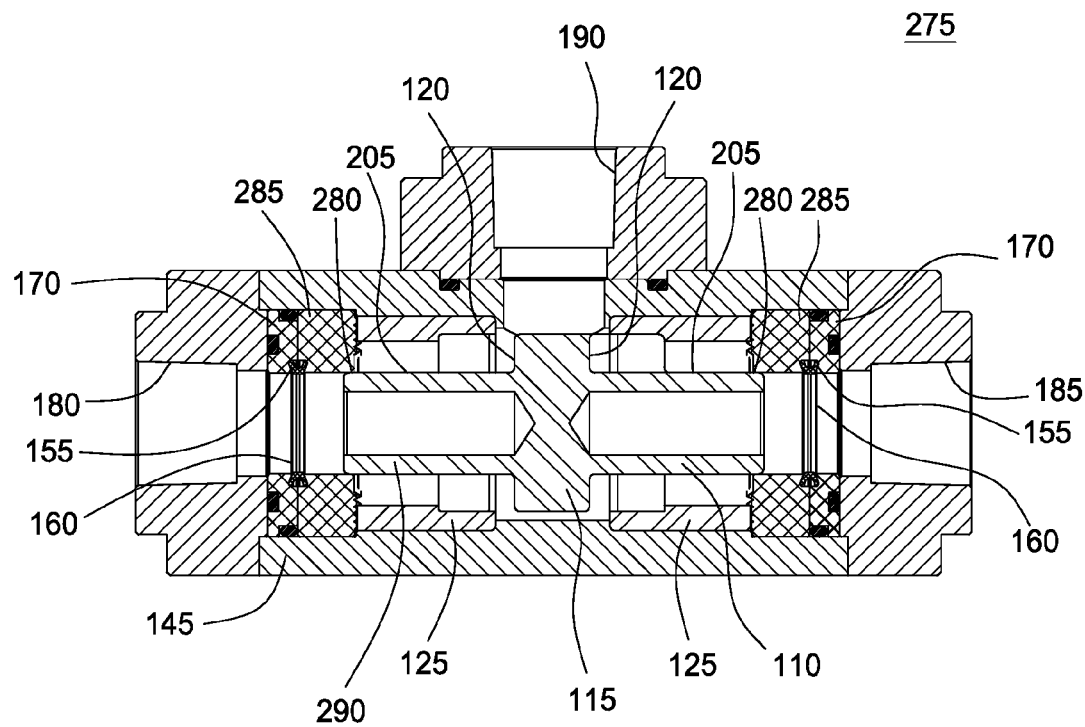
FIG. 10 illustrates an embodiment of a valve with the shuttle in the middle position.

FIG. 10 illustrates an embodiment of a valve 275 with a shuttle 290 in a middle position. For convenience, the components in the valve 275 that are similar to the components in the valve 100 will be labeled with the same reference number. The valve 275 includes a low interflow sleeve. FIGS. 1-8 illustrated a shuttle valve with high interflow sleeve. With low interflow sleeves, in the middle position, as shown in FIG. 10, the two flow paths that existed in FIG. 3 are not present. Instead an effective orifice 280 is formed between either end of the shuttle 290 and seal spacers 285 at inlets 180, 185. This affect is described as "closed center" within the control valve industry. In some applications a "closed center" shuttle valve is preferred over an "open center" shuttle valve. All other aspects of the shuttle valve described in previous FIG. 1 thru 8 also apply to the "closed center" shuttle valve of FIG. 10.

Figure 11:
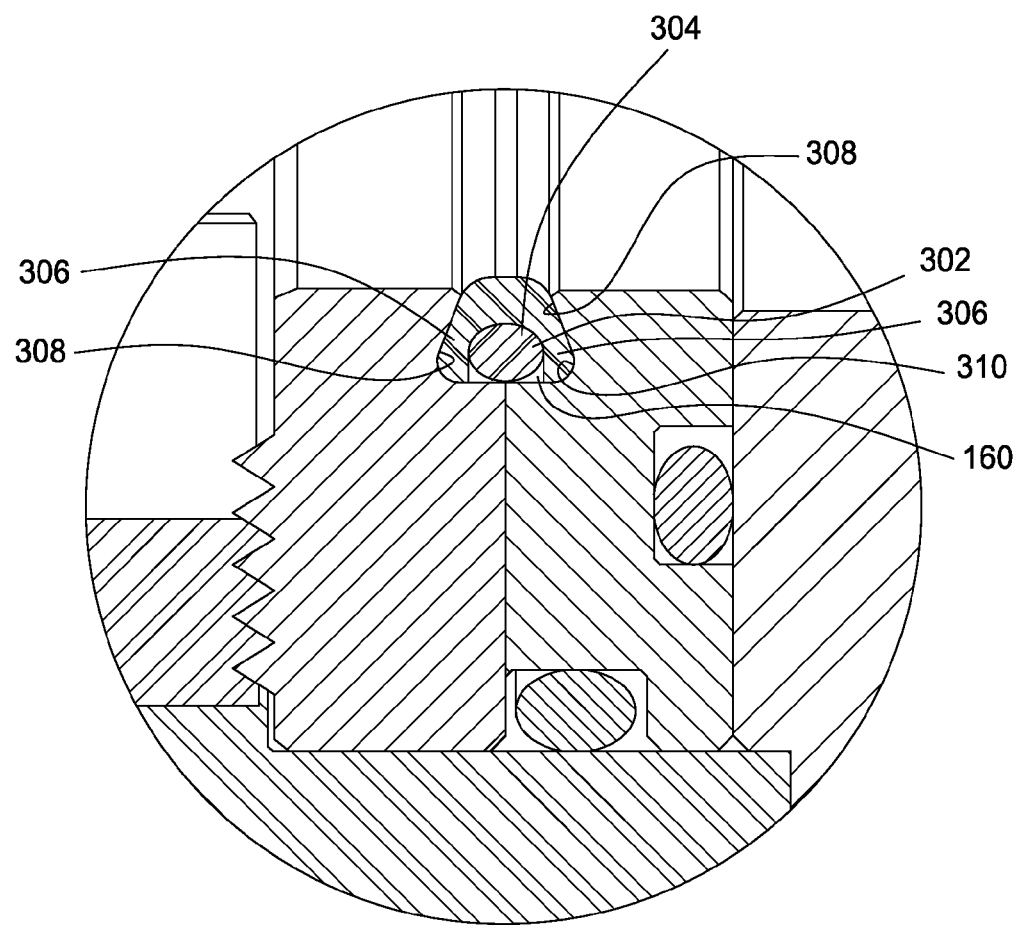
FIG. 11 illustrates an additional seal member construct as an alternative to that shown in FIG. 9.

Referring to FIG. 11, an enlarged view of and alternate construct of the seal received in the dovetail cross section groove 160 is shown. Seal 300 is the same cross section as seal 155, except a secondary ring 302 is received in the crotch or recess 304 of the V of the seal 300. The secondary ring 302 biases the sides or flanks 306 of the seal 300 outwardly against the inner side walls 308 of the v-shaped groove 310, and thereby increases the area of contact between the seal and the inner side walls 308 of the groove 310. As a result, the friction and/or stiction between the side walls 308 of the groove 310 and the flanks 306 of the seal 300 is increased as compared to seal 155 in the dovetailed section groove, further increasing resistance to extrusion of the seal 300 out of the groove as the shuttle 110 moves therepast.

The secondary ring is configured to slightly circumferentially compress the seal 300. The secondary ring 302 may be an elastomer o-ring. As the end portion 110 engages over the seal 300, the tip 312 and inner wall 314 at the base of the crotch of the seal are compressed inwardly of the groove 308, from a free position shown in dashed lines, to the compressed positions shown.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A valve comprising:
   a body having a first inlet, a second inlet and an outlet;
   a cage disposed within the body between the outlet and the first inlet, the cage comprising a first bore, having a first inner circumference, in fluid communication with the first inlet and a second bore, having a second inner circumference larger than the inner circumference of the first bore, disposed between, and in fluid communication with, the first inlet and the outlet, and a first annular ledge extending between the first bore and the second bore;
   a shuttle disposed in the body, the shuttle being movable within the body between a first position and a second position, wherein the first inlet is open and the second inlet is closed when the shuttle is in the first position, and wherein the first inlet is closed and the second inlet is open when the shuttle is in the second position, the shuttle comprising a first piston having a first outer circumference and a second piston, having a second outer circumference smaller than the first outer circumference, the second piston extending from the first piston in the direction of the first inlet and terminating at a first piston end; and
   a seal assembly disposed adjacent each inlet in a groove having opposed side walls, each seal assembly comprising a seal member with a V-shaped configuration;
   the first piston of the shuttle is selectively positionable in the second bore of the cage, to form a first circumferential orifice between the second inner circumference of the second bore and the first outer circumference of the first piston, and the second outer circumference of the second piston of the shuttle is spaced from the first inner circumference of the shuttle by a greater distance than the first outer circumference of the first piston is spaced from the second inner circumference of the cage.

2. The valve of claim 1, wherein the seal member is disposed in a split dove tail groove.

3. The valve of claim 2, wherein a first portion of the split dove tail groove is formed in a seal spacer of the seal assembly and a second portion of the split dove tail groove is formed in a seal cap of the seal assembly.

4. The valve of claim 2, further comprising a seal housing disposed between the first bore and the first inlet, the seal housing comprising a seal housing inner circumference, wherein the split dove tail groove extends inwardly of the seal housing from the seal housing inner circumference, and;
   the second piston of the shuttle is selectively positionable in the seal housing inner circumference to form a second circumferential orifice between the second piston second outer circumference and the seal housing inner circumference.

5. The valve of claim 4, wherein the distance from the location where the second piston extends from the first piston to the first piston end is greater than the distance from the first annular ledge to the seal housing.

6. The valve of claim 1, wherein the seal assembly includes a secondary ring received in the recess of the V-shaped seal member, such that portions of the V-shaped groove extend between the secondary ring and the walls of the groove.

7. The valve of claim 6, wherein the secondary ring is an elastomer o ring.

* * * * *